United States Patent [19]

Kawasoe et al.

[11] Patent Number: 5,125,783
[45] Date of Patent: Jun. 30, 1992

[54] AUTOMATIC CONVEYANCE SYSTEM

[75] Inventors: Masamichi Kawasoe, Yaita; Tadao Yokoyama, Ohtawara; Shozo Kitamoto, Touhigi, all of Japan

[73] Assignee: Fujitsu Limited, Tokyo, Japan

[21] Appl. No.: 613,058

[22] Filed: Nov. 14, 1990

[30] Foreign Application Priority Data

Nov. 14, 1989 [JP] Japan ............................ 1-294132

[51] Int. Cl.⁵ .......................... G07C 3/00; B65G 1/10
[52] U.S. Cl. ............................... 414/279; 414/281; 414/222; 198/346.1; 198/349.6
[58] Field of Search .............. 414/273, 222, 225, 226, 414/269, 277, 281, 282, 331, 364, 416; 29/430, 701, 783, 784, 787; 198/349, 346.1, 349.5, 349.6; 364/478, 424.02

[56] References Cited

U.S. PATENT DOCUMENTS

| | | | |
|---|---|---|---|
| 3,854,889 | 12/1974 | Lemelson | 198/346.1 X |
| 3,952,388 | 4/1976 | Hasegawa et al. | 198/349 X |
| 4,120,629 | 10/1978 | Christian et al. | 198/349.6 X |
| 4,195,347 | 3/1980 | MacMunn et al. | 414/281 X |
| 4,332,012 | 5/1982 | Sekine et al. | 209/552 X |
| 4,369,563 | 1/1983 | Williamson | 414/279 X |
| 4,683,540 | 7/1987 | Kuroso et al. | 209/552 X |
| 4,773,810 | 9/1988 | Nishimura et al. | 414/281 X |
| 4,815,190 | 3/1989 | Haba et al. | 414/281 X |
| 5,024,570 | 6/1991 | Kiriscko et al. | 414/222 |

FOREIGN PATENT DOCUMENTS

| | | | |
|---|---|---|---|
| 3713652 | 11/1988 | Fed. Rep. of Germany | 414/273 |
| 273402 | 12/1986 | Japan | 198/349.6 |
| 222903 | 9/1987 | Japan | 414/222 |
| 40243 | 2/1989 | Japan | 414/222 |

OTHER PUBLICATIONS

CIM im Prüffeld. Automatisches Zuführsystem for ATE-Systeme. Electronik, Oct., 1989, Martin Kistner.
Werkstatt und Betrieb, vol. 117, No. 3, Mar. 1984, p. 150.
Robotics Age, vol. 6, No. 7, Jul. 1984, The Whole Document.
Kunio Yamanaka, "Integrated Manufacturing System", Mar. 1977, p. 190.

Primary Examiner—Robert J. Spar
Assistant Examiner—Brian Dinicola
Attorney, Agent, or Firm—Helfgott & Karas

[57] ABSTRACT

An automatic conveyance system comprises a buffer storage for storing a plurality of unit racks containing units; a plurality of test cells for testing the units contained in the unit racks; and a plurality of test cell controllers, each being provided in one of the test cells and each accepting an operator's requirement to take out a unit rack from the buffer storage, to store a unit rack into the buffer storage, or to convey a unit rack from one of the test cells to another one of the test cells. The system is provided with a plurality of automatic guided vehicles for conveying unit racks. A computer is connected to the test cell controllers by a single bus and has information on the unit racks stored in the buffer storage. The computer controls each vehicle based on the requirement accepted by one of the test cell controllers and the information on the unit racks stored in the buffer storage so that the automatic guided vehicle conveys the unit rack from the buffer storage to a desired one of the test cells, between two of the test cells, or from one of the test cells to the buffer storage, whereby by supplying a requirement by an operator without knowing what, where, and when the units are stored in the buffer storage, a desired conveyance is made possible.

21 Claims, 11 Drawing Sheets

AUTOMATIC CONVEYANCE SYSTEM

BACKGROUND OF THE INVENTION

(1) Field of the Invention

The present invention relates to an automatic conveyance system in which the conveyance of units from a buffer storage to each test cell is automated.

A product manufacturing line is generally divided into an assembly line and a test line. When one product consists of only one unit such as a printed board unit, the assembly and the testing of the product are easily coupled directly. For the assembly and for the testing, a conveyer is generally used as a material handling device.

When one product consists of a number of units, however, and when the kinds of units tested are different when each unit is tested (for example, when the constitutions of measuring devices for a digital/analog conversion circuit, a low frequency circuit, a high frequency circuit, a microwave circuit and so forth are greatly different), lines or testing devices are arranged for respective kinds of units. To synchronize with the assembly process, a buffer storage is provided. The subject of the present invention is, for example in a testing process, related to a material distribution from the entering of a unit into a process to the removal of the unit from the process.

(2) Description of the Related Art

Conventionally, a number of unit shelves each including the same kinds of units are received at a receiving port and stored in a buffer storage. Test cells are arranged in a matrix, and beside each test cell, an operator is present to perform necessary tests on the units in a unit rack which was conveyed from the buffer storage. The unit rack, including units on which the test has completed, is returned from the test cell to the buffer storage.

As a means for automating the distribution of the units from the buffer storage to respective test cells, a conveyer, an automatic guided vehicle a linear motor car, and so forth have been conventionally considered. When the conveyer or the linear motor car is used, however, once the conveyance path is arranged, it is difficult to change the layout so that the flexibility in terms of modification of the system is low and the cost is excessive. For the flexibility, however, the automatic guided vehicle is advantageous.

In the conventional conveyance using an automatic guided vehicle, however, there are problems as described later in detail.

Because of the above disadvantages, conventionally, the conveyance by an automatic guided vehicle is limited to a very simple operation with a relatively small number of stations.

SUMMARY OF THE INVENTION

In view of the problems in the above-described conventional systems, the objects of the present invention are, in an automatic conveyance system in which the conveyance of a unit rack from a buffer storage to each test cell is automated, to increase the flexibility of the system, to improve the running efficiency of the automatic guided vehicle, and to decrease the system cost.

To attain the above objects, there is provided, according to the present invention, an automatic conveyance system for conveying a unit rack capable of containing at least one unit. The system comprises a buffer storage for storing a plurality of unit racks, each of the unit racks being empty or containing at least one unit; a plurality of test cells for testing the units contained in the unit racks; a plurality of test cell controllers, each being provided in one of the test cells, and each receiving a requirement from an operator to take out a unit rack from the buffer storage, to store a unit rack into the buffer storage, or to convey a unit rack from one of the test cells to another one of the test cells; an automatic guided vehicle for conveying a unit rack; and a computer connected to the buffer storage, the test cell controllers and the automatic guided vehicle, and having information on the unit racks stored in the buffer storage. The computer controls, based on the above requirement accepted by one of the test cell controllers and the information of the unit racks stored in the buffer storage, the automatic guided vehicle so as to convey the unit rack from the buffer storage to a desired one of the test cells, between two of the test cells, or from one of the test cells to the another process.

Each of the unit racks is provided with a bar code for identifying the unit racks, the buffer storage having a bar-code reader for reading the bar code when each of the unit racks is stored in the buffer storage, and the read bar code being sent to the computer and stored therein as a part of the unit rack information.

The information in the computer comprises the sequence in which the unit racks are stored, which contain the same kind of units, into the buffer storage.

The computer has means for taking out the unit racks from the buffer storage in accordance with the unit rack storing sequence stored in the memory.

The computer comprises means for changing the sequence stored in the memory in response to a demand from the test cell controllers.

The computer comprises means for deleting a unit rack from the sequence after the unit rack is taken out from the buffer storage.

The information in the computer comprises the corresponding relationship between each of the test cells and a kind of unit which can be tested in the test cell.

The information in the computer also comprises a storing sequence file for registering the storing sequence of the unit racks in the buffer storage, a shelf managing file for registering the locations of the unit racks in the buffer storage, and a cell master file for registering the corresponding relationship between each test cell and a kind of unit which can be tested in the test cell.

The computer further comprises means for generating a conveyance instruction with reference to the storing sequence file, the shelf managing file, and the cell master file, the conveyance instruction being supplied to the automatic guided vehicle.

The computer is connected to the test cell controllers by a single bus.

The system further comprises a cell group controller, connected between the computer and the test cell controllers, the cell group controller being commonly connected to the test cell controllers by a single bus, the cell group controller generating FROM-TO data based on the requirement accepted by one of the test cell controllers, the FROM-TO data indicating the location of the removal of a unit rack and the destination of the unit rack, the FROM-TO data being sent to the computer, and the computer controlling the automatic guided vehicle based on the FROM-TO data.

The system further comprises a conveyance device controller, connected to the computer, to the buffer storage, and to the automatic guided vehicle, for generating conveyance data based on the FROM-TO data sent from the cell group controller via the computer, the conveyance data indicating the conveyance route from the buffer storage to one of the test cells, between two of the test cells, or from one of the test cells to another process, the conveyance data being supplied to the automatic guided vehicle.

The conveyance device controller has means for controlling, based on the conveyance data, the automatic guided vehicle so as to remove a unit rack from the buffer storage for conveyance to one of the test cells, to convey a unit rack from one of the test cells to another one of the test cells, or to convey a unit rack from one of the test cells to another process.

The system further comprises a test complete station for accommodating unit racks containing units on which the tests have been finished in the corresponding test cells.

The test cells are arranged in a plurality of arrays extending in parallel, and the conveyance device controller having means for controlling the automatic guided vehicle in such a way as to convey one of the unit racks from the buffer storage to a test cell belonging to one of the arrays of the test cells, to convey the unit rack between the test cells belonging to one of the arrays of the test cells, or to convey from one of the test cells to the test complete station, wherein the automatic guided vehicle, when running between the test cell arrays, runs in only one direction parallel to the test cell arrays.

The computer has means for, when it has received a plurality of conveyance requirements before outputting a conveyance instruction to the automatic guided vehicle, sending a conveyance instruction to the conveyance device controller in such a way that, by rearranging the plurality of conveyance requirements by which the conveyance routes, based on the conveyance requirements for conveying the automatic guided vehicle in parallel with one of the test cell arrays, the conveyance routes do not overlap each other, so that the plurality of conveyance requirements can be processed in one conveyance operation from the buffer storage to the test complete station.

The computer has means for controlling the conveyance device controller in such a way that a plurality of loading/unloading operations to and from the test cells can be executed within one running of the automatic guided vehicle from the buffer storage to the test complete station.

The automatic guided vehicle comprises loading means for loading at least one of the unit racks from the automatic guided vehicle into each of the test cells, and unloading means for unloading at least one of the unit racks from each of the test cells into the automatic guided vehicle.

Each of the test cells comprises a station for supporting a unit rack received from the automatic guided vehicle or for supporting a unit rack to be moved to the automatic guided vehicle, the station having a mount which does not have driving means for loading or unloading the unit rack.

Each of the test cells comprises a station for loading a unit rack from the automatic guided vehicle into the test cell or for unloading a unit rack from the test cell into the automatic guided vehicle, each pair of stations in two adjacent arrays being arranged opposite each other.

BRIEF DESCRIPTION OF THE DRAWINGS

The above objects and features of the present invention will be more apparent from the following description of the preferred embodiments with reference to the drawings; wherein.

DESCRIPTION OF THE PREFERRED EMBODIMENTS

Figure 1:
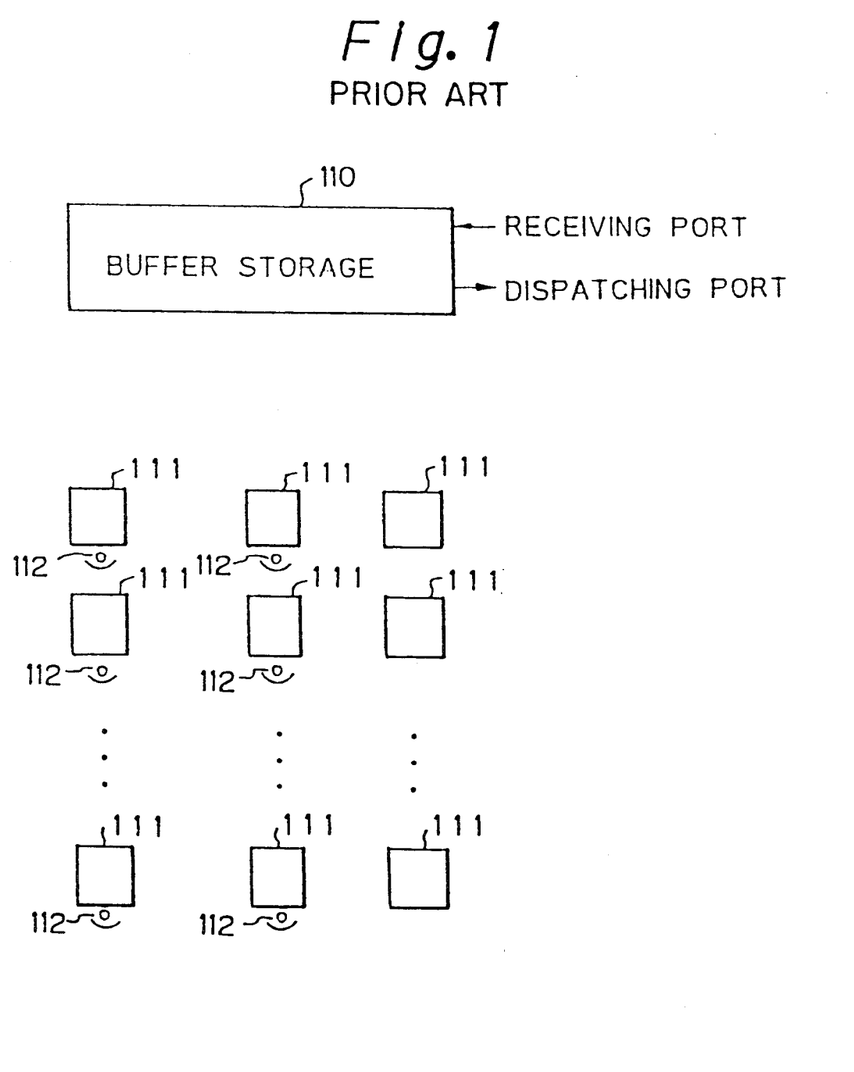
FIG. 1 is a block diagram showing an example of a layout of a conventional test factory.

For easier understanding of the present invention, an example of a layout of a conventional test factory will be first described with reference to FIG. 1. FIG. 1 is a diagram showing an example of an arrangement of a buffer storage and test cells in a conventional test factory. In the figure, a number of unit racks each containing at least one unit or being empty, are received at a receiving port and stored in a buffer storage 110. Test cells 111 are arranged in a matrix. Beside each test cell, an operator 112 is present to perform necessary tests on the units which have been conveyed from the buffer storage 110. The unit rack containing units on which the tests have been completed is returned from the test cell 111 to the buffer storage 110.

As a means for automating the distribution of the unit racks from the buffer storage 110 to respective test cells 111, a conveyer, an automatic guided vehicle (generally referred to as an AGV), a linear motor car, and so forth have been conventionally considered. When the conveyer or the linear motor car is used, however, once the conveyance path is arranged, it is difficult to change the layout so that the flexibility for modification of the system is low and the cost is expensive. For flexibility, however, the automatic guided vehicle is advantageous.

The conventional conveyance by the automatic guided vehicle, however, has the following problems:

(a) at the buffer storage 110, receiving a unit rack and dispatching a unit rack are carried out at any time, so that the operator 112 has to know what, where, and when the unit rack is stored;

(b) when a conveyance is required, a push button is conventionally used. Therefore, between a controller (not shown in FIG. 1) for controlling the system and test cells 111, a bundle of signal lines carrying, e.g., the push button signal, a signal for transmitting an abnormality of the buffer storage or the automatic guided vehicle, and so forth, must be arranged. As a result, there are disadvantages in that, once the signal lines have been established, it is difficult to add a signal line and the construction becomes large in scale;

(c) when a run instruction to the automatic guided vehicle is to be executed only at a predetermined home position, the next instruction cannot be generated until the automatic guided vehicle returns back to the home position, so that there is a disadvantage in that an effective running (namely, to prevent running of the automatic guided vehicle without any load) cannot be realized. To avoid this disadvantage, if a device for generating an instruction is provided in each test cell, the same number of devices as the number of the test cells becomes necessary so that the total system cost is raised;

(d) in each test cell, a loading station for loading a unit rack into the test cell and an unloading station for unloading a unit rack from the test cell are necessary. Further, if an automatic moving and loading function is provided in each station, the cost for each station is raised.

The object of the present invention is to eliminate the above-mentioned problems.

Next, embodiments of the present invention are described in the following. Throughout the specification, the same reference numbers represent the same parts.

Figure 2:
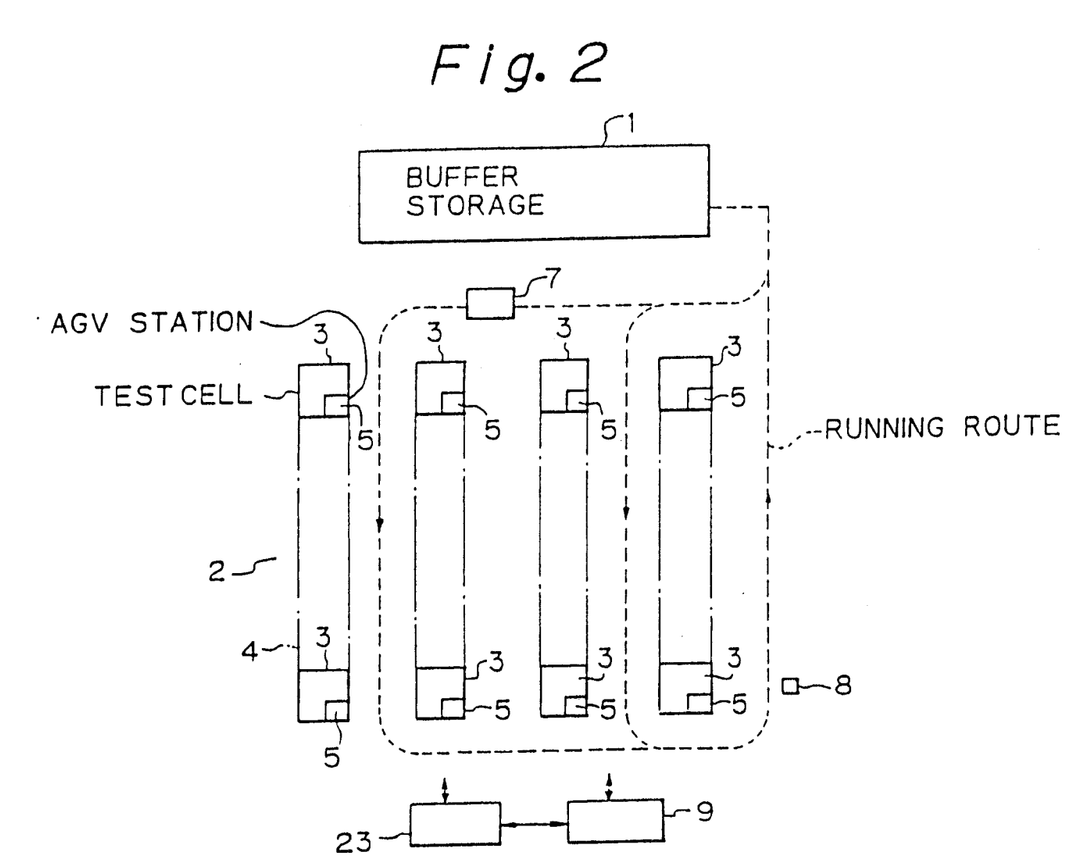
FIG. 2 is a block diagram showing the principle of the present invention.

FIG. 2 is a principal block diagram of the present invention. In the figure, 1 is a buffer storage for storing unit racks each containing the same kinds of units, 2 is a test cell group, 3 is a test cell for testing various functions of the units, 4 is a test cell array, 5 is a test cell controller, 7 is an automatic guided vehicle, 8 is a test complete station, 9 is an upper order computer, and 23 is a conveyance device controller. In the buffer storage 1, a number of shelves (not shown in the figure) are provided. Each of the shelves is designed to hold one of the unit racks. The test cell group 2 consists of a plurality of the test cell arrays 4. The test cell arrays 4 are arranged in parallel. Each of the test cell arrays 4 consists of a plurality of the test cells 3 arranged in one direction. The test cell controller 5 is provided in each of the test cells 3, for accepting a requirement from an operator to remove a unit rack from the buffer storage 1, to store a unit rack into the buffer storage, or to convey a unit rack from one of the test cells to another one of the test cells. The upper order computer 9 controls, based on the requirement from each test cell controller 5, the storing of the unit rack into the buffer storage 1, the removal of the unit rack from the buffer storage 1, or the conveyance of the unit rack between the test cells. The automatic guided vehicle 7 conveys a unit rack, and the test complete station 8 accommodates a unit rack being empty or containing at least one unit on which the tests in the test cells 3 have been completed. The conveyance device controller 23 controls, based on the control by the upper order computer 9, the automatic guided vehicle 7 so as to convey a unit rack from the buffer storage 1 to the test cell 3 belonging to one of the test cell arrays 4, between the test cells 3 belonging to one of the test cell arrays 4, or from one of the test cells 3 to the test complete station 8.

The automatic guided vehicle 7 runs only in one direction parallel to the test cell arrays 4 when it runs between the test cell arrays 4.

It is preferable that the upper order computer 9, when it has received a plurality of conveyance requirements before outputting a conveyance instruction to the automatic guided vehicle 7, sends a conveyance instruction to the conveyance device controller 23 in such a way that, by rearranging a plurality of conveyance requirements by which the conveyance routes, based on the conveyance requirements for conveying the automatic guided vehicle 7 in parallel with one of the test cell arrays, do not overlap each other, the plurality of conveyance requirements are processed by one conveyance operation from the buffer storage 1 to the test complete station 8.

It is preferable that the upper order 9 controls the conveyance device controller 23 in such a way that a plurality of loading/unloading operations to and from the test cells 3 can be executed within one running of the automatic guided vehicle from the buffer storage 1 to the test complete station 8.

It is also preferable that the automatic guided vehicle 7 comprises a moving and loading unit for moving and loading the unit racks from the automatic guided vehicle 7 to the test cells 3.

It is further preferable that each of the unit racks is provided with a bar code for identifying the kind of units contained in the unit rack, and each of the test cells 3 is provided with an automatic bar-code reader for reading the bar code.

Since the upper order computer 9 manages the unit racks and their location in the buffer storage 1, the operator need not know what is stored at what location at any time.

Since the buffer storage 1 and the upper order computer 9, and the automatic guided vehicle 7 and the upper order computer 9 are connected by buses, even when a test cell or an automatic guided vehicle is added, no special construction is needed and it is easy to cope with the addition.

Since the running is not executed each time a requirement from each test cell is generated, and a plurality of run instructions can be processed for only one run, effective running can be realized at a low cost (namely, the time when the automatic guided vehicle runs without load is limited as much as possible).

Since the automatic guided vehicle 7 comprises the moving and loading unit for moving and loading the unit rack from the automatic guided vehicle 7 to the test cell 3, a unit rack loading station and a unit rack unloading station can be realized by a single station in each test cell, and a means for driving a unit rack for loading becomes unnecessary in each test cell so that each test cell can be constructed at a low cost.

Figure 3:
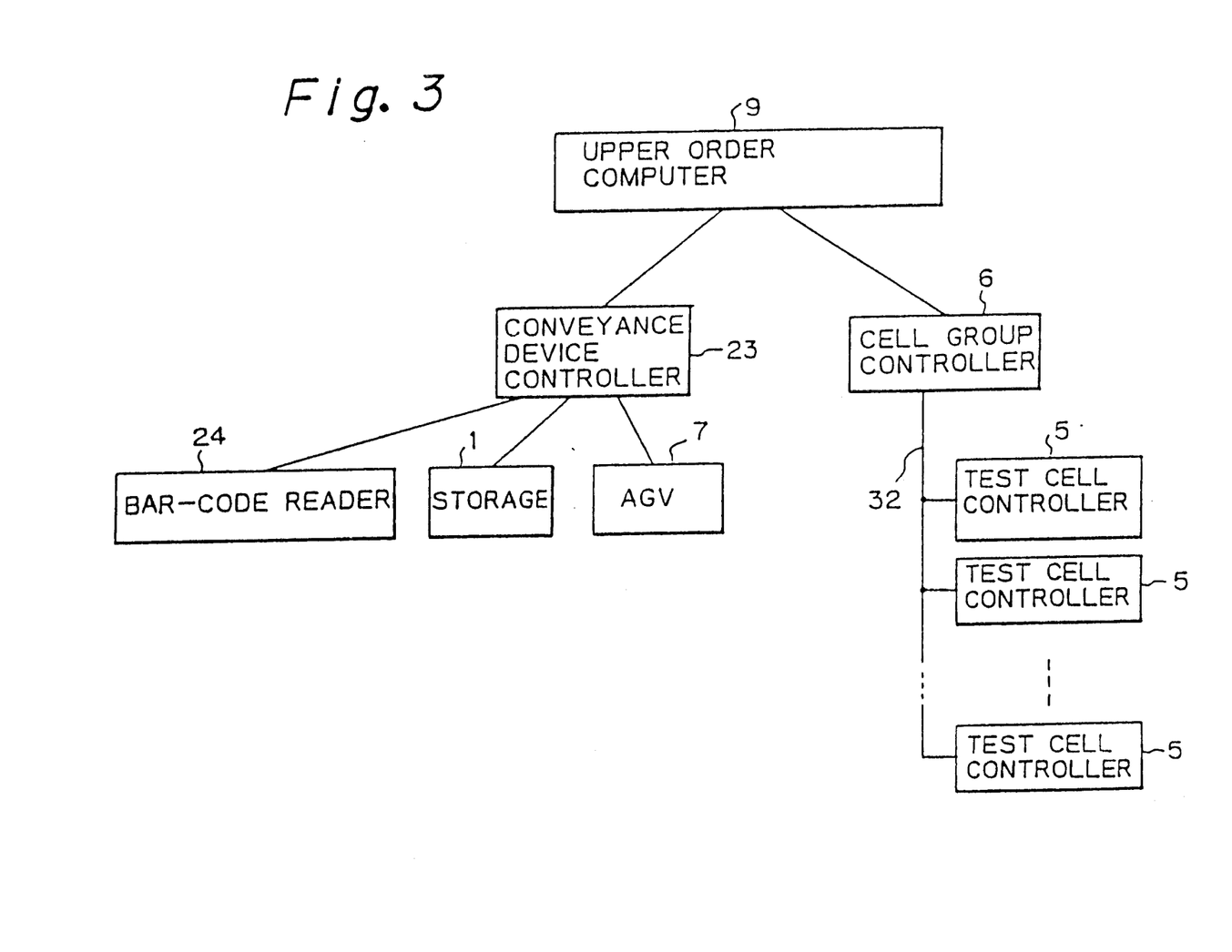
FIG. 3 is a block diagram showing the construction of an information system in an automatic guided vehicle conveyance system according to an embodiment of the present invention.
Figure 4:
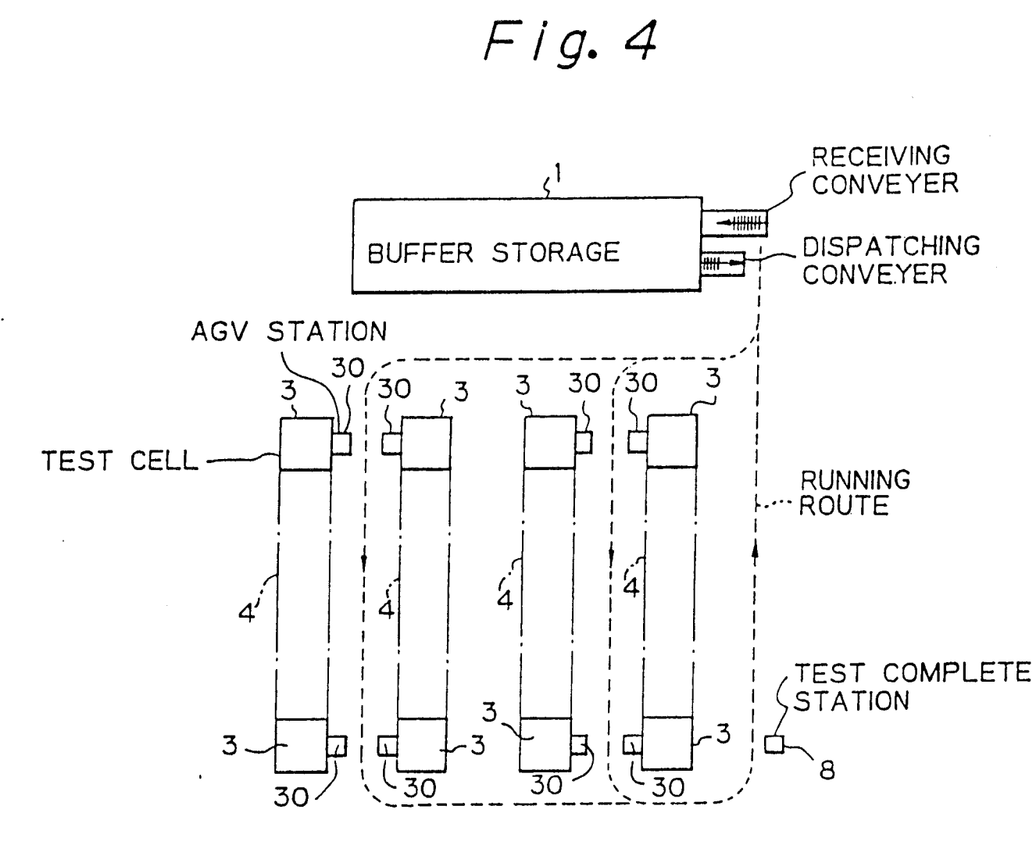
FIG. 4 is a block diagram showing an example of a layout in a factory of an automatic guided vehicle conveyance system according to an embodiment of the present invention.

FIG. 3 is a block diagram showing the construction of the information network of an automatic guided vehicle conveying system according to an embodiment of the present invention, and FIG. 4 is a diagram showing the arrangement of the automatic guided vehicle conveying system according to the embodiment of the present invention. In FIGS. 3 and 4, test cell controllers 5, which are computers, are arranged in respective test cells 3, and are connected by a single coaxial cable 32 or a bus so as to communicate with a cell group controller 6 by a communication method which usual computers generally have. The cell group controller 6 is connected to an upper order computer 9 having more information (for example, a system for managing the total factory or overall processes). Similarly, a conveyance device controller 23 is connected to the upper order computer 9.

At the receiving port of the buffer storage 1 (see FIG. 1), an automatic bar-code reader 24 is provided so that the bar code (a code for identifying the kind of units in the unit rack) provided on the unit rack is read by the conveyance device controller 23. The conveyance device controller 23 has a function to control shelves in the buffer storage 1, and what is stored in which of the shelves is informed to the upper order computer 9.

The upper order computer 9 has, for each test cell, information files relating to the kinds of units. By these files, it can be recognized, for each one of the unit racks, which of the test cells is able to check the functions of the unit. There are a storing sequence file for registering the sequence in which the unit racks are stored into the buffer storage 1, a shelf managing file for registering the locations of the unit racks in the buffer storage 1, and a cell master file which is a reference master file for registering the corresponding relationship between each test cell 3 and a drawing No. indicating a unit which can be tested in the test cell.

As shown in FIG. 4, there are a number of test cells, for example more than 50 test cells, arranged in a plurality of arrays. In the figure, four arrays are illustrated as an example. Each of the test cells 3 is provided with an AGV station 30. With respect to the adjacent test cell arrays 4, the AGV stations 30 are arranged to be opposite each other, whereby the loading of a unit rack into the AGV station 30 or the unloading of a unit rack from the AGV station 30 is possible at either of the right or the left AGV station at each the test cells 3 during running through one running route. Also, since the automatic guided vehicle runs in a single direction, a countermeasure for preventing collisions when a plurality of automatic guided vehicles are driven is easily provided.

Since the test cell controllers 5 are connected through the bus 32 and the cell group controller 6 is connected to the upper order computer 9, and since the upper order computer 9 stores various files as mentioned above, the operator may merely indicate the requirement of a necessary unit without knowing whether or not the unit is stored in the buffer storage 1. If the specified unit is stored in the buffer storage 1, a message indicating the specified unit will be conveyed soon is sent from the buffer storage 1 to the test cell controller 5. If the specified unit is not stored in the buffer storage 1, a message indicating the specified unit is not stored in the buffer storage 1 is sent from the buffer storage 1 to the test cell controller 5.

The storing sequence file and the shelf managing file may be combined to a single storing sequence file. In this case, the single storing file may have, for each unit rack, areas for storing a buffer storage number indicating the storing sequence of the unit rack; a rack number for identifying the unit rack; year, month, date and time when the unit rack is stored in the buffer storage 1; a shelf number indicating the number of the shelf where the unit rack is located; the number of units in the unit rack; a managing number for the unit rack; an order number of the units in the unit rack; an additional number indicating, for example, working processes or the appointed date of delivery; and a drawing No. indicating the kind of the units contained in the unit rack. More detailed information can be obtained by referring to a rack information file using the rack number as a key. The rack information file may have areas for storing a rack number; year, month, date, and time of registration; the number of the units contained in the unit rack; a flag indicating whether or not the unit rack is stored in the buffer storage or dispatched from the buffer storage; the newest number of the units in the unit rack; the symbols of the first, second, third . . . test cells of the unit rack to be loaded when a test is executed through a plurality of test cells; a managing number; an order number; an additional number; and a drawing No. The number of units in the unit rack is changed because, when a problem occurs during a visual inspection or during a test process, the defective unit is repaired in another line so that only good units are sent to the next process. Accordingly, the number of units in the unit rack is changed from the original number of units. Thus, the newest data of the number of units is input into the shelf managing file at a final process.

The cell master file has areas, for example, for storing a station number indicating the station at which loading or unloading of the unit is possible; the name of the kind of the unit; the name of the test cell; and a section of a line to be used. The section of a line is used when a new line is added.

In addition to the above-mentioned files, other files such as a drawing master file also may be employed. In the drawing master file, the drawing Nos. allocated to respective kinds of units and the names of the kinds of the units are stored.

Figure 5:
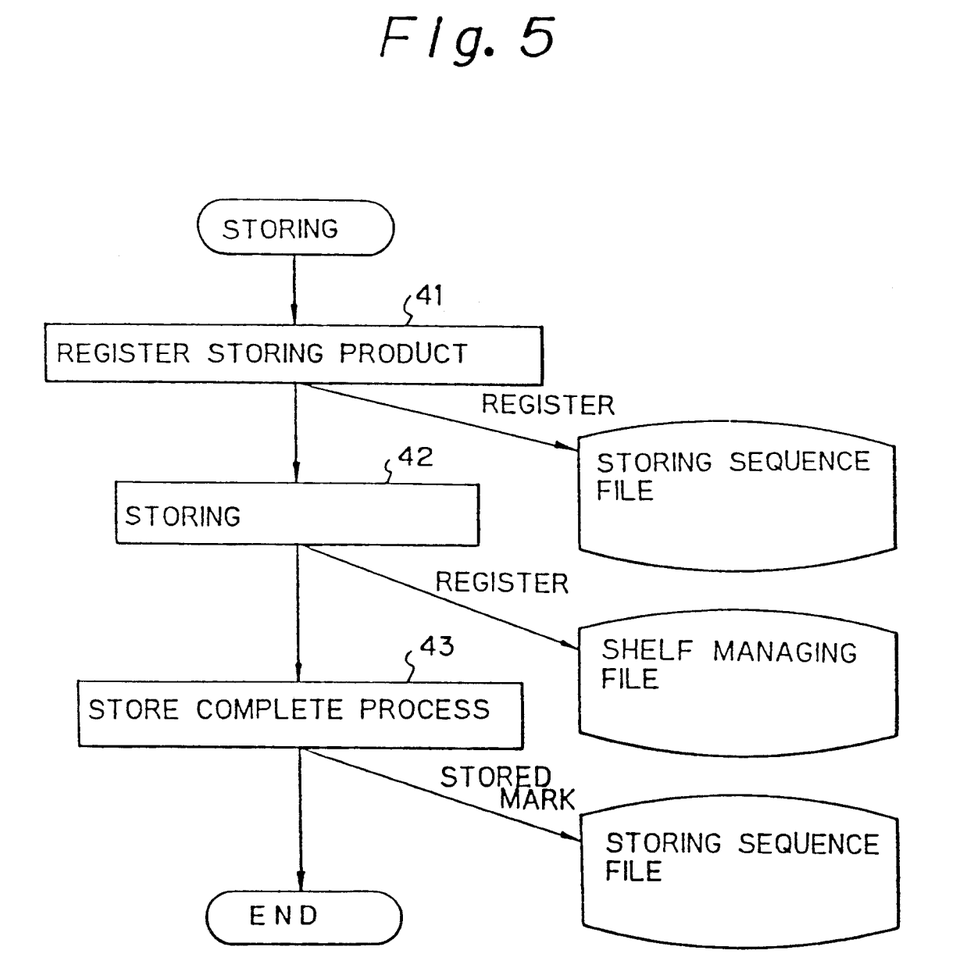
FIG. 5 is a flowchart for explaining a storing process according to an embodiment of the present invention.

FIG. 5 is a flowchart for explaining the process of storing the units into the buffer storage 1 by the upper order computer 9 according to an embodiment of the present invention. In the figure, at step 41, the unit racks to be stored are registered in the storing sequence file in the sequence of buffer storage into the buffer storage 1. At the step 42, the unit racks are stored under the control of the upper order computer 9. Then, at the step 43, storing completion process is carried out so that the stored unit racks are registered in the storing sequence file, and the stored unit racks are labeled with marks indicating the storing has been finished.

Figure 6A:
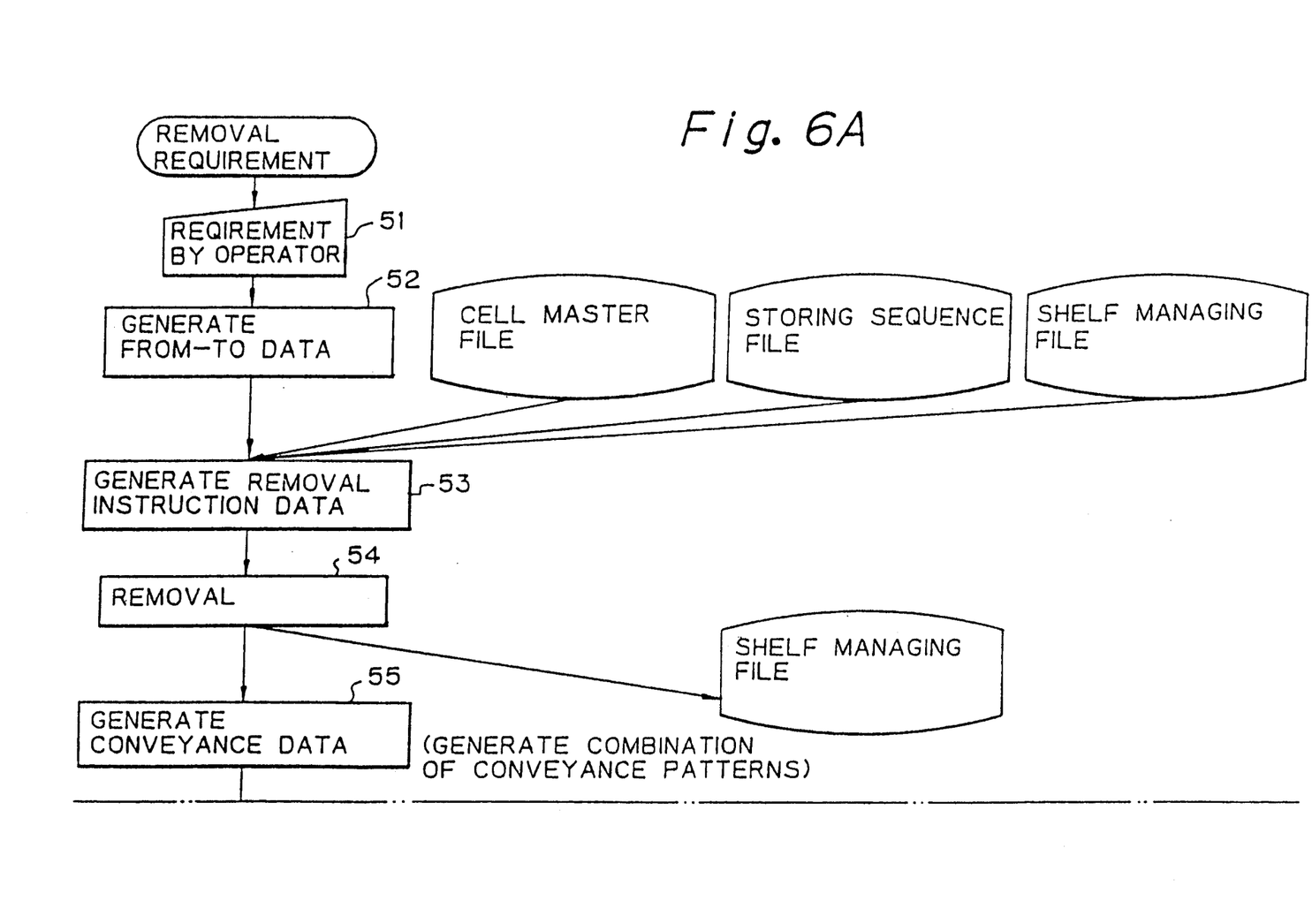
FIG. 6A and 6B show a flowchart for explaining a removal process according to an embodiment of the present invention.
Figure 6B:
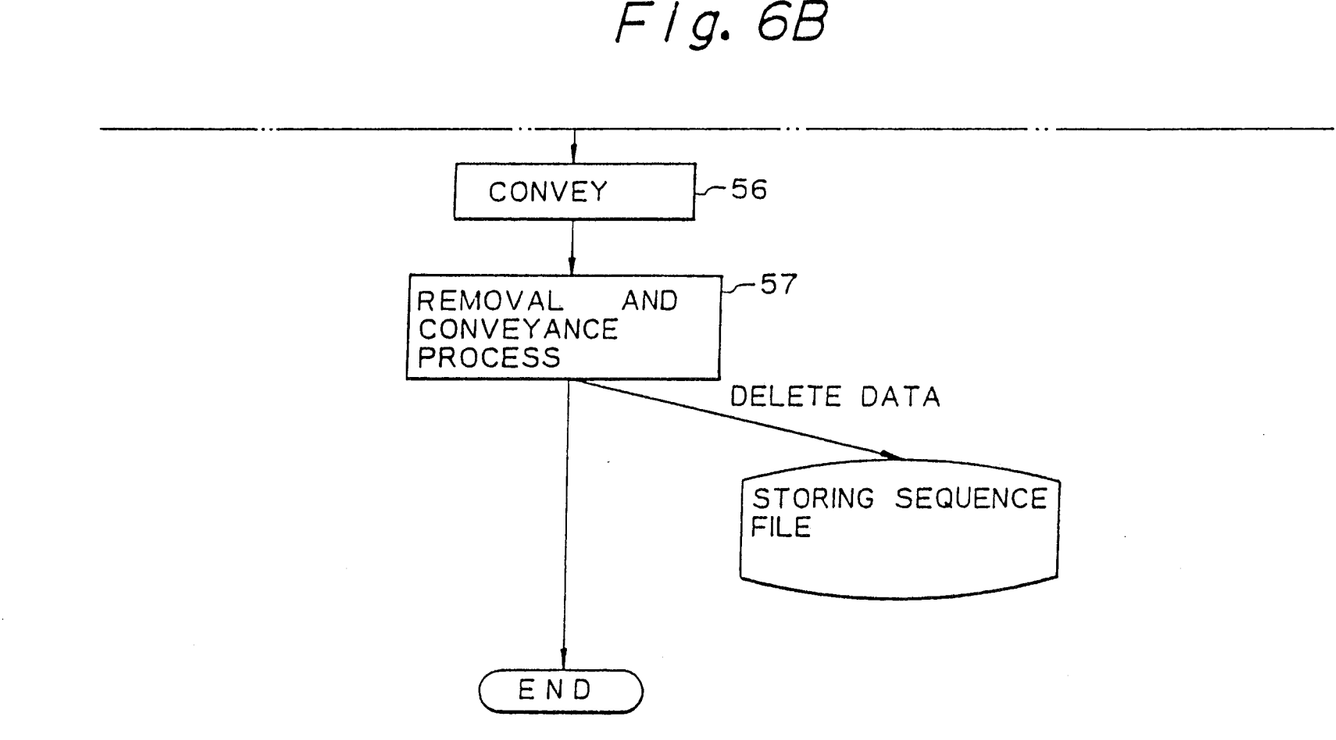

FIGS. 6A and 6B show a flowchart for explaining the process of a unit rack removal requirement from the buffer storage 1 to a desired test cell 3 according to an embodiment of the present invention. In the figures, at the step 51, when an operator standing beside a certain test cell 3 requests removal of a unit rack from the buffer storage 1, then at the step 52, the cell group controller 6 forms, in response to the requirement, FROM-TO data indicating the conveyance origin and the conveyance destination of the unit rack. Then, at the step 53, the upper order computer 9 generates removal instruction data and provides it to the conveyance device controller 23 with reference to the cell master file, the storing sequence file, and the shelf managing file. The conveyance device controller 23 carries out a removal operation of the required unit rack by controlling the buffer storage 1 based on the instruction. After this, the data relating to the above-described unit rack is deleted with reference to the shelf managing file.

Then, at the step 55, conveyance data is formed. At this time, when a plurality of removal requirements are provided, the conveyance device controller 23 automatically searches, based on the running route instructed initially, requirements which can be processed without running the automatic guided vehicle with no load. Namely, the conveyance device controller 23 generates conveyance data in such a way that, when it has received a plurality of conveyance requirements before providing a conveyance instruction, a sequence of the plurality of conveyance requirements in which the conveyance routes do not overlap, is rearranged so that the plurality of conveyance requirements can be processed in only one conveyance run from the buffer storage 1 to the test complete station 8. Then, at the step 56, the automatic guided vehicle is moved based on the above-mentioned conveyance data, and at the step 57, the processes of removal from the buffer storage and of conveyance are carried out. After this, the data relating to the unit racks which have been removed from the buffer storage are deleted from the loading sequence file.

Figure 7:
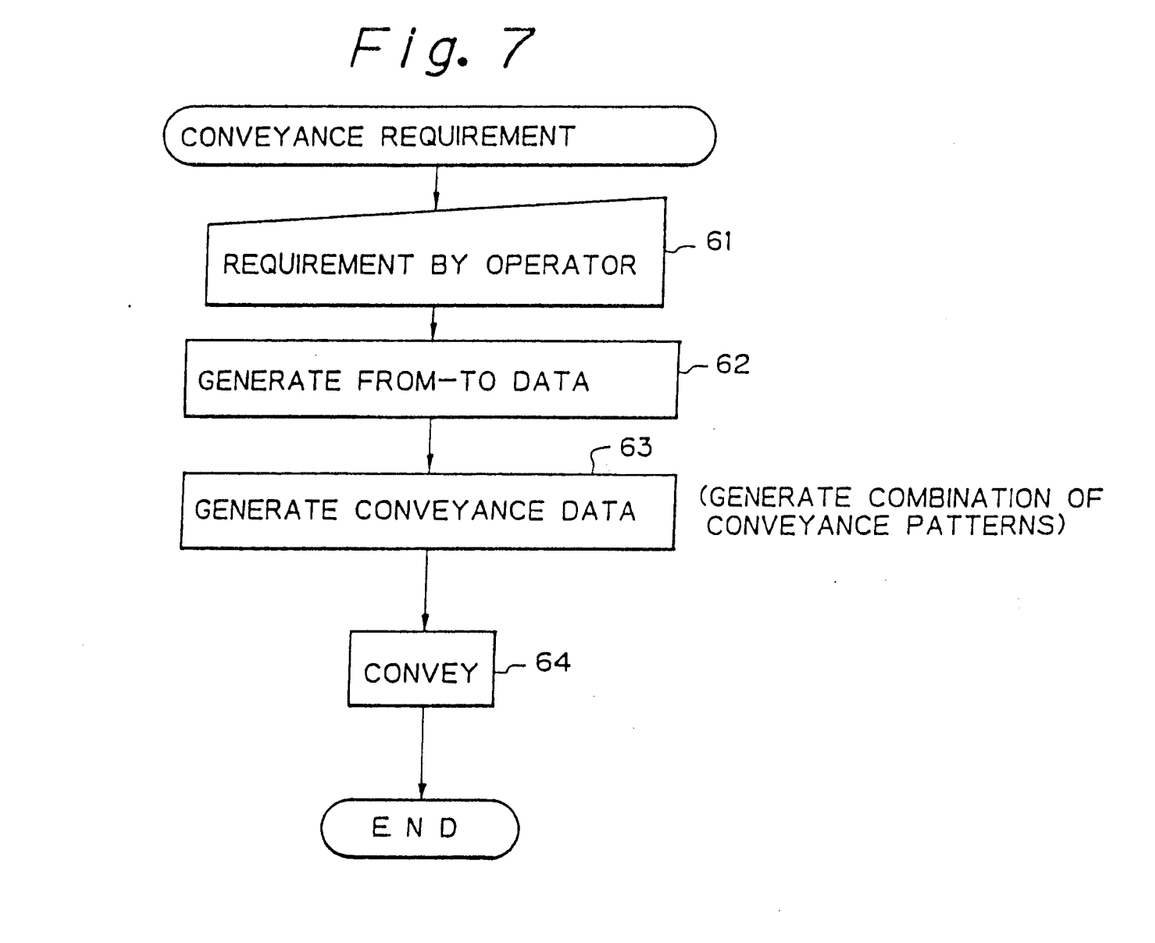
FIG. 7 is a flowchart for explaining a conveyance process according to an embodiment of the present invention.

FIG. 7 is a flowchart for explaining a process of a requirement for conveying a unit rack from a certain test cell to another test cell, according to an embodiment of the present invention. In the figure, at the step 61, when an operator generates a conveyance requirement, the cell group controller 21 generates FROM-TO data. Based on this data, at the step 62, the computer 9 generates conveyance data and provides it to the conveyance device controller 23. In this case also, the conveyance device controller 23 generates conveyance data in such a way that, when it has received a plurality of conveyance requirements before providing a conveyance instruction, a sequence of the plurality of conveyance requirements in which the conveyance routes do not overlap, is rearranged so that the plurality of conveyance requirements can be processed in only one conveyance run from the buffer storage 1 to the test complete station 8. Then, at the step 64, the running of the automatic guided vehicle is controlled based on the above-mentioned conveyance data.

The operation in accordance with the conveyance requirements for the respective unit racks as described with reference to FIGS. 5 and 6 is summarized as follows.

(a) When an operator pushes a key in the test cell controller indicating a requirement for a removal or a conveyance, only the number of the own cell and the requirement of the removal or the conveyance are informed to the cell group controller 6.

(b) The cell group controller 6 adds, to the informed requirement, a code indicating that the informed requirement is a kind of conveyance control. The added information is sent to the upper order computer 9 which handles various information.

(c) When the upper order computer 9 receives the removal requirement, it recognizes, based on the kind of unit information and the buffer storage information, which kind of unit should be transferred and in which of the shelves the unit is stored, so as to instruct the conveyance device controller 23. When the conveyance requirement is received, a conveyance code is simply informed to the conveyance device controller 23.

(d) The conveyance device controller 23 controls the buffer storage 1 to remove a unit rack from the specified shelf. Also, a combination of effective running routes is formed by the removal/conveyance instructions received up to that time, and the running pattern is indicated to the automatic guided vehicle 7 (see FIG. 8).

(e) In response to the above-mentioned added information, the upper order computer 9 returns an answer to the test cell controller 23 indicating that the related devices are normal or abnormal. The returned answer is displayed on a display provided in the test cell controller 5.

Figure 8:
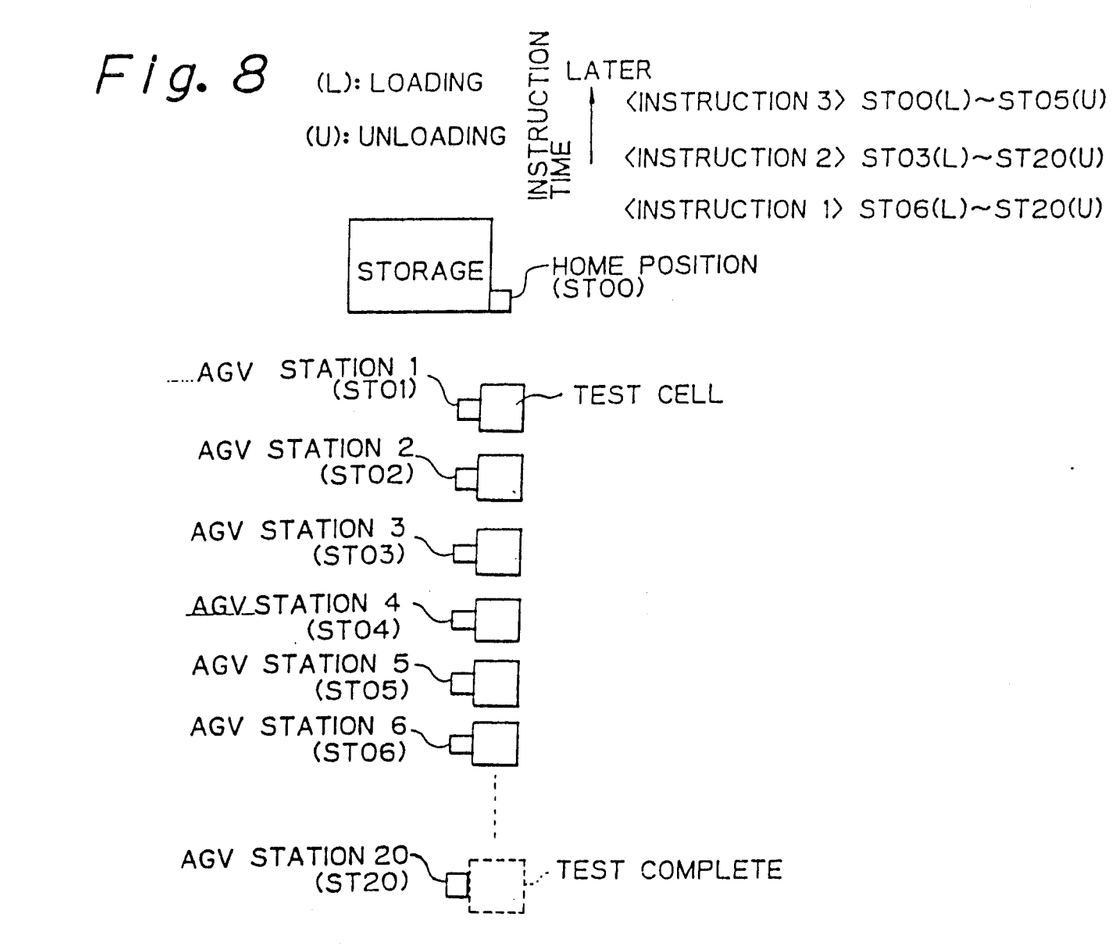
FIG. 8 is a diagram showing an example of rearrangement of running instructions of an automatic guided vehicle according to an embodiment of the present invention.

FIG. 8 is a diagram showing an example of the formation of the above-mentioned effective running pattern according to an embodiment of the present invention. In the figure, a home position provided in the buffer storage 1 is represented by ST00; automatic guided vehicle stations provided in the test cells belonging to one test cell array are represented by ST01 to ST06; the test complete station is represented by ST20; loading of a unit rack at each station is represented by L; and unloading of a unit rack is represented by U. <instruction (1)>:ST06(L)-ST20(U) is the instruction to convey a unit rack from the station ST06 to the station ST20; <instruction (2)>:ST03(L)-ST20(U) is an instruction to convey a unit rack from the station ST03 to the station ST20; and <instruction (3)>:ST00(L)-ST0-5(U) is an instruction to convey a unit rack from the station ST00 to the station ST05. When the instructions (1) to (3) are generated in this order, and when the instruction (3) is to be executed, if the instruction (1) and the instruction (2) have been already received by the conveyance device controller 23, the conveyance device controller 23 searches, based on the running route by the instruction (1) which is the first instruction, instructions by which the automatic guided vehicle can run without load if the instructions are rearranged. Then, the rearranged running route is given to the automatic guided vehicle. In the above example, when <instruction (3)>:ST00(L)-ST05(U) is first executed and then <instruction (1)>:ST06(L)-ST(U) is executed, the two instructions can be realized in one run. The instruction (2) may be executed in the next or after the next run.

Next, in the automatic guided vehicle and in the AGV station, the following means are employed.

Figure 9:
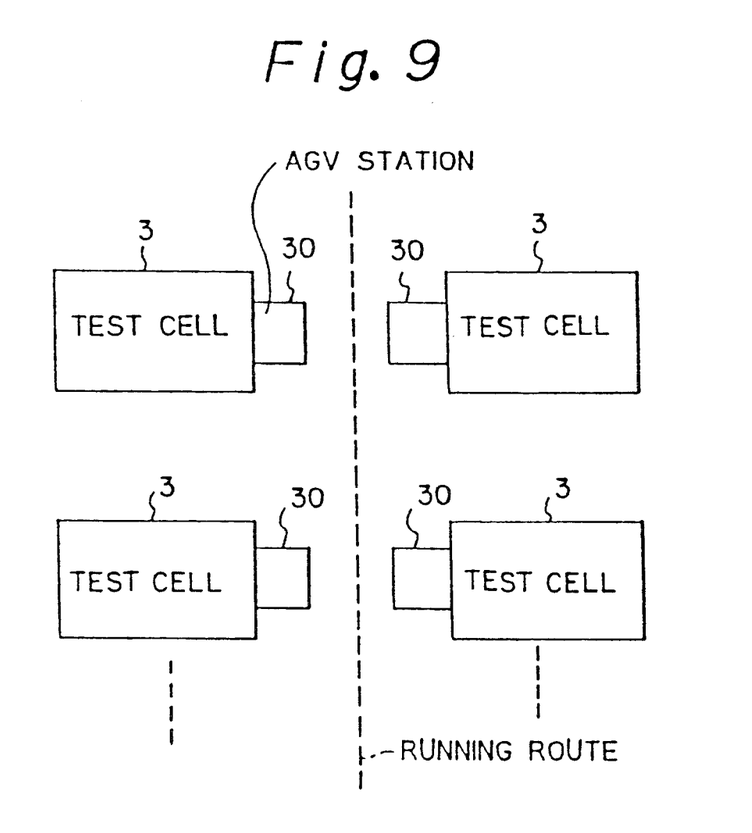
FIG. 9 is a diagram for explaining the arrangement of the automatic guided vehicle stations according to an embodiment of the present invention.
Figure 10:
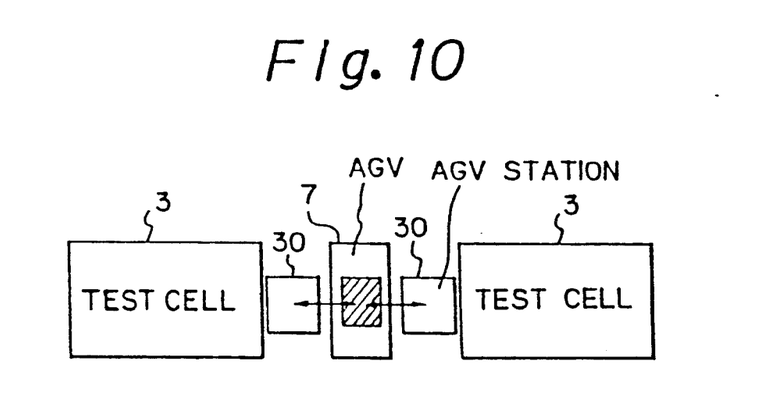
FIG. 10 is a diagram for explaining loading and unloading of a unit rack into and from the automatic guided vehicle stations.

First, as shown in FIGS. 9 and 10, the test cells 3 and the automatic guided vehicle stations 30 are arranged symmetrically on the right and the left locations with respect to one running route, so that the movement and the loading of the unit racks are possible at either of the right or the left station within one run.

Figure 11:
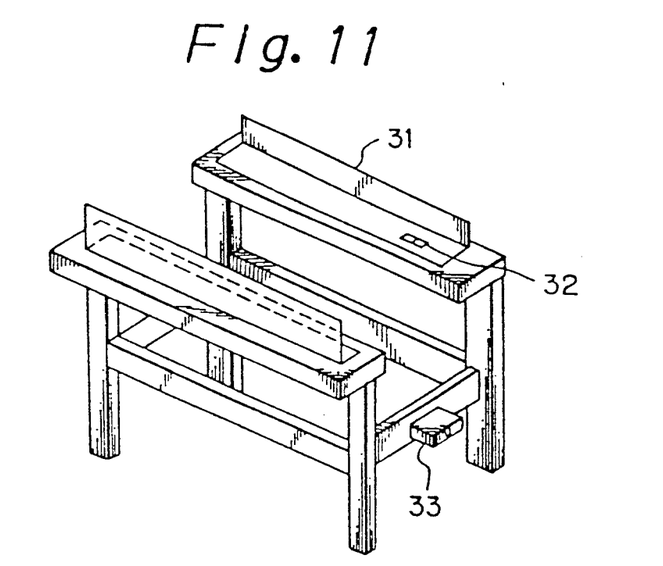
FIG. 11 is a diagram showing the construction of the automatic guided vehicle station according to an embodiment of the present invention.

Next, as shown in FIG. 11, each of the automatic guided vehicle stations 30 is constructed simply as a receiving mount which does not need a driving device for loading and unloading the unit racks. For loading and unloading the unit racks to and from the automatic guided vehicle 7, a forklift method is employed, and the automatic guided vehicle 7 is provided with a fork. By the forklift method, the fork part, which is used for mounting a unit rack, extends to a receiving mount 31 of the AGV station 30, and then is lowered in a downward direction to unload the unit rack. When a unit rack is to be loaded, conversely, the fork part at the lowered position extends, and then raises up to load the unit rack on the mount of the automatic guided vehicle. On the receiving mount 31, a rotary switch 32 is provided. According to the direction of the rotary switch 32, it is discriminated whether a unit rack is loaded into the receiving mount 31 or the unit rack is unloaded from the receiving mount 31. The AGV station 30 is also provided with a light emitting unit 33 by which it can be discriminated whether or not there is a unit rack on the receiving mount 31 and whether or not the unit rack can be unloaded from the receiving mount 31.

By constructing each of the large number of stations as a simple receiving mount as mentioned above, the cost of the stations is lowered and both loading and unloading is possible by one station.

Figure 12:
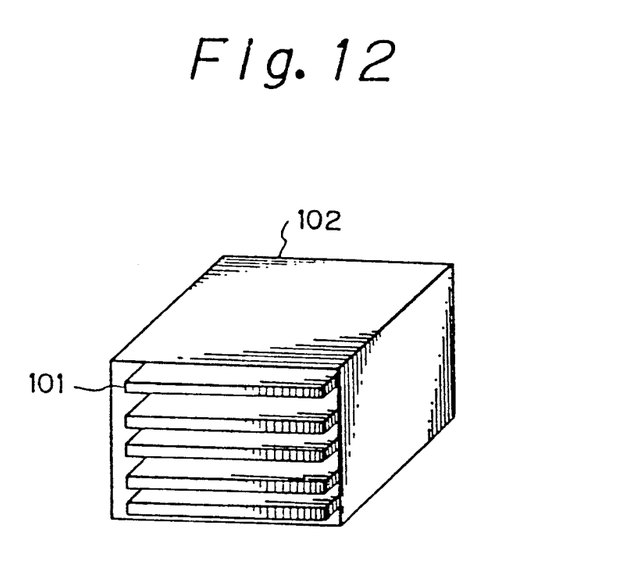
FIG. 12 is a diagram showing the construction of a unit rack used in an embodiment of the present invention.

FIG. 12 is a diagram showing an example of a unit rack which is the subject of the conveyance in the test factory according to an embodiment of the present invention. In the figure, a unit rack 102, which contains printed circuit boards (PCB units) 101 as the units, is taken out from the buffer storage 1 and the PCB units are tested in a test cell. The unit rack 102 of the PCB units on which the tests have been completed is conveyed to the test complete station 8 in which the test completed units are collected.

As will be apparent from the above explanation, the effects obtained according to the present invention are as follows.

(a) Without knowing the contents in the buffer storage but by merely sending a request signal from an operator, a necessary unit rack can be taken out from the buffer storage and conveyed to the desired test cell.

(b) Since the computers are connected by a single signal line (bus line) as hardware, when information is to be added, the corresponding change is possible by updating only the software so that the flexibility is expanded.

(c) The device construction is cheap, the processing ability of the automatic guided vehicle is increased, and the space efficiency is improved.

(d) Corresponding flexibility is provided for changing the layout of the test factory or for additional installations.

(e) The cost of a station is low.

(f) The processing ability of the automatic guided vehicle is improved.

(g) The space efficiency of the test factory is improved.

We claim:

1. An automatic conveyance system for conveying unit racks, each rack being capable of containing at least one unit, the system comprising:
a buffer storage for storing a plurality of unit racks, said unit racks being empty or containing units;
a plurality of test cells for testing said units contained in said unit racks;
a plurality of test cell controllers each being provided in one of said test cells and each being constructed to accept a requirement from an operator to remove a unit rack from said buffer storage, to store a unit rack into said buffer storage and to convey a unit rack from one of said test cells to another one of said test cells;
a plurality of automatic guided vehicles each conveying a unit rack; and
a computer connected to said buffer storage and containing information on said unit racks, said computer being also connected to said test cell controllers and to each of said automatic guided vehicles, said computer including means for controlling each automatic guided vehicle, based on the requirement accepted by a respective one of said test cell controllers and said information on said unit racks stored in said buffer storage, so that a respective automatic guided vehicle conveys an assigned unit rack from said buffer storage to a desired one of said test cells, between two of said test cells, and from one of said test cells to another process,
said computer automatically generating a combination of instructions for the plurality of automatic guided vehicles to run through different running routes in one run of each automatic guided vehicle, each of said automatic guided vehicles comprising a forklift means, and each of said test cells comprising means for loading and unloading the unit racks to and from each of the automatic guided vehicles.

2. An automatic conveyance system as claimed in claim 1, wherein each of said unit racks is provided with a bar code for identifying each of said unit racks, said buffer storage has a bar-code reader for reading said bar code when each of said unit racks is stored in said buffer storage, the read bar code being sent to said computer and stored therein as a part of said unit rack information.

3. An automatic conveyance system as claimed in claim 1, wherein said information contained in said computer comprises information on a sequence of storing of unit racks which contain the same kind of units, into said buffer storage.

4. An automatic conveyance system as claimed in claim 3, wherein said computer has a means for removing said unit racks from said buffer storage in accordance with said sequence of storing of said unit racks stored in said computer.

5. An automatic conveyance system as claimed in claim 4, wherein said computer comprises means for changing said information on said sequence stored in said computer in response to a demand from a respective test cell controller.

6. An automatic conveyance system as claimed in claim 5, wherein said computer comprises means for deleting a unit rack from said sequence after said unit rack is taken out from said buffer storage.

7. An automatic conveyance system as claimed in claim 1, wherein said information in said computer comprises a corresponding relationship between each of said test cells and a kind of unit which can be tested in said test cell.

8. An automatic conveyance system as claimed in claim 1, wherein said information in said computer comprises a storing sequence file for registering the sequence of storing the unit racks into said buffer storage, a shelf managing file for registering the locations of the unit racks in said buffer storage, and a cell master file for registering the corresponding relationship between each test cell and a kind of a unit which can be tested in the test cell.

9. An automatic conveyance system as claimed in claim 8, wherein said computer comprises means for generating a conveyance instruction with reference to said storing sequence file, said shelf managing file, and said cell master file, said conveyance instruction being supplied to said automatic guided vehicle.

10. An automatic conveyance system as claimed in claim 1, further comprising a single bus for connecting said computer to said test cell controllers.

11. An automatic conveyance system as claimed in claim 1, further comprising a cell group controllers connected between said computer and aid test cell controllers, a single bus for connecting said cell group controller commonly to said test cell controllers, said cell group controllers generating FROM-TO data based on the requirement accepted by one of said test cell controllers, said FROM-TO data indicating the location of the removal of a unit rack and the destination of the unit rack, said FROM-TO data being sent to said computer, said computer controlling each automatic guided vehicle based on said FROM-TO data.

12. An automatic conveyance system as claimed in claim 11, further comprising a conveyance device controller, connected to said computer, to said buffer storage, and to each automatic guided vehicle, for generating conveyance data based on said FROM-TO data sent from said cell group controller via said computer, said conveyance data indicating the conveyance route from said buffer storage to one of said test cells, between two of said test cells, and from one of said test cells to another process, said conveyance data being supplied to said automatic guided vehicle.

13. An automatic conveyance system as claimed in claim 12, wherein said conveyance device controller has means for controlling, based on said conveyance data, each automatic guided vehicle so as to take out a unit rack from said buffer storage to one of said test cells, to convey a unit rack from one of said test cells to another one of said test cells, and to convey a unit rack from one of said test cells to another process.

14. An automatic conveyance system as claimed in claim 1, further comprising a test complete station for accommodating unit racks containing units on which all tests have been finished in the corresponding test cells.

15. An automatic conveyance system as claimed in claim 14, wherein said test cells are arranged in a plurality of arrays extending in parallel, and said conveyance device controller having means for controlling each automatic guided vehicle in such a way that said vehicle conveys one of said unit racks from said buffer storage to a test cell belonging to one of said arrays of said test cells, between the test cells belonging to one of said arrays, and from one of said test cells to said test complete station,
wherein said automatic guided vehicle, when running between said test cell arrays, runs in only one direction parallel to said test cell arrays.

16. An automatic conveyance system as claimed in claim 14, wherein said computer has means for sending when it has received a plurality of conveyance requirements before outputting a conveyance instruction to each automatic guided vehicle, a conveyance instruction to said conveyance device controller in such a way that said plurality of conveyance requirements by which the conveyance routes are rearranged based on the conveyance requirements for conveying the automatic guided vehicle in parallel with one of the test cell arrays, do not overlap each other and said plurality of conveyance requirements are processed in one conveyance operation from said buffer storage to said test complete station.

17. An automatic conveyance system as claimed in claim 14, wherein said computer has means for controlling said conveyance device controller in such a way that a plurality of loading/unloading operations to and from said test cells can be executed within one running of said automatic guided vehicle from said buffer storage to said test complete station.

18. An automatic conveyance system as claimed in claim 1, wherein each automatic guided vehicle comprises loading means for loading at least one of said unit racks from said automatic guided vehicle to each of said test cells, and unloading means for unloading at least one of said unit racks from each of said test cells to said automatic guided vehicle.

19. An automatic conveyance system as claimed in claim 18, wherein each of said test cells comprises a station for supporting a unit rack to be moved to each automatic guided vehicle and into each test cell, said station having a mount which is constructed to provide loading or unloading of the unit rack without driving means.

20. An automatic conveyance system as claimed in claim 15, wherein each of said test cells comprises a station for supporting a unit rack to be moved to each automatic guided vehicle and into each test cell, each pair of stations in two adjacent arrays being arranged opposite each other.

21. An automatic conveyance system as claimed in claim 1, wherein each said automatic guided vehicle comprises means for loading and unloading a unit rack at both sides of the automatic guided vehicle.

* * * * *